United States Patent [19]

DeGan

[11] Patent Number: 4,715,254
[45] Date of Patent: Dec. 29, 1987

[54] SAW GUIDE WITH COOLING AND LUBRICATING CAPABILITY

[76] Inventor: Allen D. DeGan, 655 Hilltop Dr. #69, Redding, Calif. 96003

[21] Appl. No.: 3,061

[22] Filed: Jan. 14, 1987

[51] Int. Cl.[4] .............................................. B27B 5/29
[52] U.S. Cl. ...................................... 83/169; 83/171; 83/698; 83/821
[58] Field of Search .............. 83/168, 169, 171, 425.3, 83/820, 821, 698

[56] References Cited

U.S. PATENT DOCUMENTS

| | | | |
|---|---|---|---|
| 3,240,243 | 3/1966 | Golick | 83/169 X |
| 3,540,334 | 12/1968 | McLaughlan | 83/13 |
| 3,593,763 | 7/1971 | Neild | 143/160 |
| 3,623,520 | 11/1971 | Neild | 143/164 |
| 3,661,045 | 5/1972 | Mermelstein | 83/676 |
| 3,674,065 | 7/1972 | Fairfield, Jr. et al. | 143/160 R |
| 3,703,915 | 11/1972 | Pearson | 83/824 |
| 3,750,503 | 8/1973 | McMillan | 83/16 |
| 3,918,334 | 11/1975 | Wilcox | 83/13 |
| 4,136,590 | 1/1979 | Kordyban et al. | 83/169 |
| 4,635,513 | 1/1987 | McGeehee | 83/169 |

Primary Examiner—Paul A. Bell
Assistant Examiner—Hien H. Phan
Attorney, Agent, or Firm—Leonard D. Schappert

[57] ABSTRACT

A saw guide is provided with cooling and lubricating capability which guides a saw during cutting of wood and other materials and includes a mixing capability so that two coolants and/or lubricants can be mixed at the saw guide just prior to cooling or lubrication of a saw blade to reduce the likelihood of separation of insoluble combinations of coolants and/or lubricants prior to application to the saw blade.

7 Claims, 5 Drawing Figures

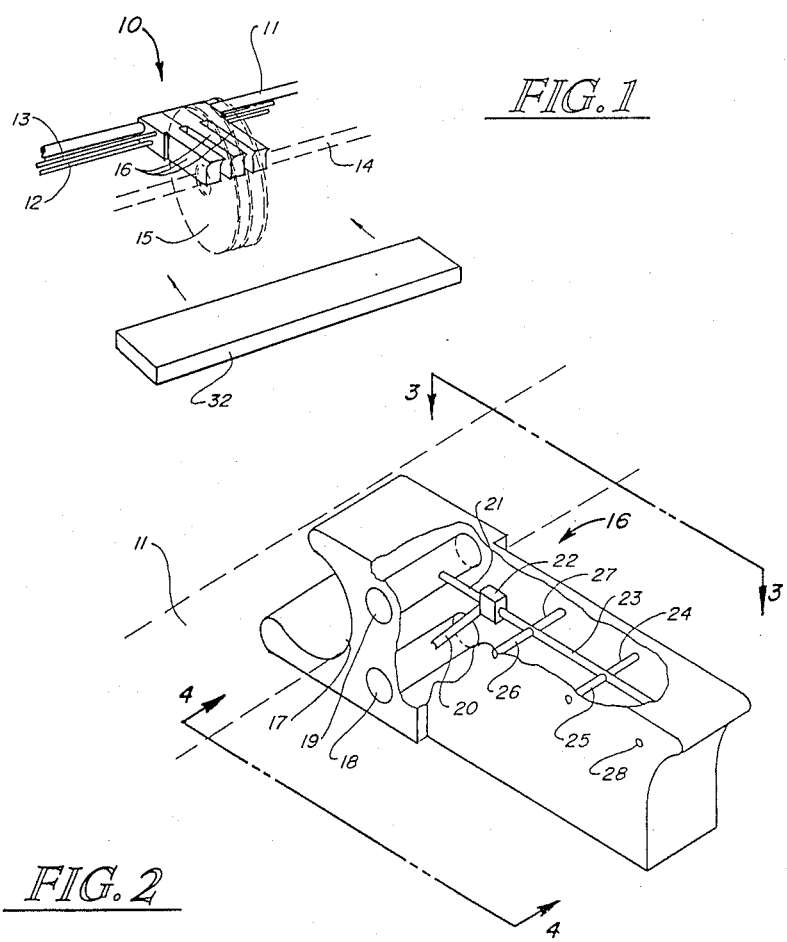
FIG. 1
FIG. 2
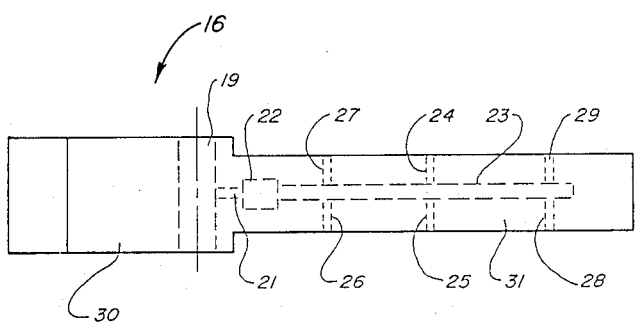
FIG. 3

SAW GUIDE WITH COOLING AND LUBRICATING CAPABILITY

BACKGROUND OF THE INVENTION

1. Field of the Invention

The present invention relates generally to guide apparatus for sawing wood and other materials, and more specifically to saw guides which include cooling and lubricating capabilities.

2. Description of the Prior Art

In the past, inventors have directed their efforts toward saw guides designed to guide a saw as a piece of wood is being cut, as well as saw guides in combination with thinner saw blades to reduce the waste materials produced during the cutting activity. Others have directed their efforts toward creating means of cooling and lubricating the saw blade during cutting action. Although previous inventions have sought to accomplish the results accomplished by the present invention, namely cooling and lubricating, none of the prior art of which applicant is aware has taught a saw guide having the unique capability of the present invention to maintain a mixture of precisely the desired composition necessary for cooling and lubricating under different conditions.

SUMMARY OF THE INVENTION

The present invention consists of a saw guide with cooling and lubricating capability which guides a saw as wood or other materials are cut and also includes a capability for cooling and lubricating the saw blades utilized in cutting utilizing a mixture of air, water or oil or any other cooling or lubricating agents individually or in different combinstions as desired. One of the unique features of the present invention is that, if two lubricants are to be mixed and utilized to cool and lubricate the saw blade, the desired mixing takes place inside the saw guide itself just before the fluids are sprayed onto the saw blade. This function reduces the likelihood of separation of the cooling and lubricating agents prior to spraying onto the saw blade. This is especially important when the agents utilized are oil, water and/or air, which tend to separate almost immediately after mixing. The present invention includes at least two lines into which air and/or fluids are channeled and a mixing block positioned inside the guide block in close proximity to the orifices through which the lubricant and/or coolant is sprayed onto the saw blade. The location of the mixing capability at the individual guide blocks and the resulting fine control of the combination of lubricants and coolants utilized for purposes of lubricating and cooling the saw blade is unique, and has been unknown heretofore. All previous efforts have been to mix such coolants and/or lubricants outside the guide, resulting in separation or condensation before the agents exit the quide.

One of the objects of the present invention is to provide a saw guide with cooling and lubricating capabilities.

A further object of the present invention is to provide a guide block which may be utilized in combination with other guide blocks to provide a saw guide for use in cutting lumber.

Another object of the present invention is to provide a saw guide having at least two incoming lines capable of carrying coolants and/or lubricants and means of delivering such coolants for delivery to a saw blade to be cooled and/or lubricated.

Another object of the present invention is to provide a means of delivering a combination of coolants and/or lubricants in a controlled, well-blended mixture to a saw blade to be cooled and/or lubricated.

A further object of the present invention is to provide a saw guide which includes a capability for mixing lubricants and/or coolants therein, thereby reducing the amount of lubricant and/or coolant necessary for lubricating and cooling and minimizing the amount of fluid deposited in the waste material.

Another object of the present invention is to provide a saw guide which, as a result of its mixing capability and the minimal lubricating and/or cooling fluids utilized, reduces the amount of fluid deposited in the waste material, thereby increasing the BTU value of the waste material.

The foregoing objects, as well as other objects and benefits of the present invention, are made more apparent by the descriptions and claims which follow.

BRIEF DESCRIPTION OF THE DRAWINGS

FIG. 1 of the drawings is a perspective view showing a group of guide blocks positioned with circular saw blades to guide a saw blade while a piece of wood is being cut.

FIG. 2 of the drawings is a perspective view of the guide block with appropriate cutaways showing the construction thereof which produces finely controlled lubricating and cooling of the saw blade.

FIG. 3 is a top view of the guide block of FIG. 2 taken along lines 3—3 of FIG. 2 showing the structure of the guide block.

DESCRIPTION OF THE PREFERRED EMBODIMENT

Figure 4:
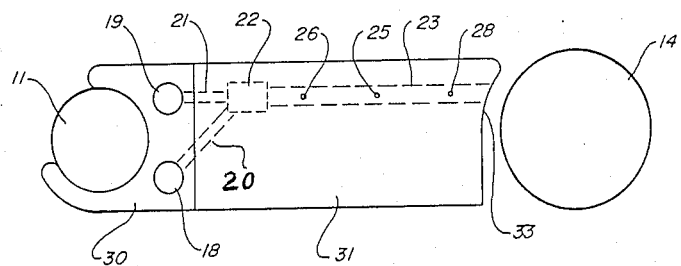
FIG. 4 is a side view of the guide block of FIG. 2 taken along lines 4—4 of FIG. 2 further illustrating the structure of the guide block.

FIG. 1 of the drawings shows a saw guide system 10 which includes guide blocks 16 positioned to guide saw blades 15 while wood 32 is being cut, and to lubricate saw blades 15 as discussed below. Saw blades 15 are operated by rotation of arbor 14, to which they are attached. Guide blocks 16 are held together by rod 11, to which they are attached, and may be held tightly together by means of a hydraulic clamping system or any other clamping means capable of holding them tightly together. Fluid lines 12 and 13 are provided to deliver coolants and/or lubricants to guide blocks 16. While fluid lines 12 and 13 are shown extending out from guide blocks 16 in both directions, such lines are normally closed off at one end unless other guide blocks 16 and saw blades 15, offset from those shown in FIG. 1, are utilized.

FIG. 2 of the drawings shows the construction of guide block 16 in detail. Guide block 16 is relieved at 17 to accept rod 11, which is utilized in helping to clamp guide blocks 16 together and in positioning and orienting them properly. Fluid from fluid lines 12 and 13 of FIG. 1 flows into guide block 16. When several guide blocks 16 are utilized together as shown in FIG. 1 to form a composite saw guide system 10 as shown in FIG. 1, o-rings or other acceptable sealing apparatus or pressure resulting from the clamping together of guide blocks 16 is utilized to seal holes 18 and 19 where buide blocks 16 butt together to prevent leaking of cooling and/or lubricating fluid. Means for providing two coolants and/or lubricants, as shown by holes 18 and 19, is provided for the purpose of supplying a combination of oil, water and/or air or any other desired coolant or lubricant to guide block 16 without prior mixing, and mixing means consisting of mixing block 22 is provided to mix such coolants and/or lubricants inside of guide block 16, thereby maintaining a fine control over the mixture utilized. Lines 20 and 21 deliver lubricants and/or coolants from holes 18 and 19 to mixing block 22. The coolants and/or lubricants coming through lines 20 and 21 are mixed in mixing block 22, and they exit into line 23 and out through orifices 24, 25, 26, 27, 28 and 29 to cool and/or lubricate saw blades 15 of FIG. 1 of the drawings. As shown in FIG. 1 of the drawings, the sides of the saw blades 15 sit in close proximity to the point where coolant and/or lubricant exits orifices 24, 25, 26, 27, 28 and 29. Because of the close proximity of mixing block 22 to orifices 24, 25, 26, 27, 28 and 29, a coolant such as water can be pumped into hole 18 and through line 20 and into mixing block 22 while oil is pumped into hole 19 and through line 21 and into mixing block 22, effecting the delivery of a combination of both coolants and/or lubricants which would normally separate if mixed at a distance from guide block 16. When mixed in mixing block 22, the water and oil exit the orifices of buide block 16 before separating. As a result, the fine control necessary for maintaining proper ratio and mist where necessary to properly cool and lubricate the saw blades 15 is maintained.

FIG. 3 of the drawings is a top view of guide block 16 of FIG. 2 taken along lines 3—3 of FIG. 2. The guide block 16 consists of two sections: a wider section 30 containing holes 18 and 19, and a narrower section 31 containing the mixing block 22 and the orifices 24, 25, 26, 27, 28 and 29. This difference in width is necessary to accommodate saw blades 15 when several guide blocks 16 are utilized togetner to form the saw guide system 10 of FIG. 1.

FIG. 4 of the drawings is a side view of the guide block 16 of FIG. 2 taken along lines 4—4 of FIG. 2. The positions of holes 18 and 19 in section 30, as well as holes 20 and 21, mixing block 22, line 23 and orifices 25, 26 and 28, are also shown with respect to section 31. The end of section 31 of guide block 16 has a curved surface 33 to conform to the shape and diameter of arbor 14, to which saw blades 15 are attached.

Figure 5:
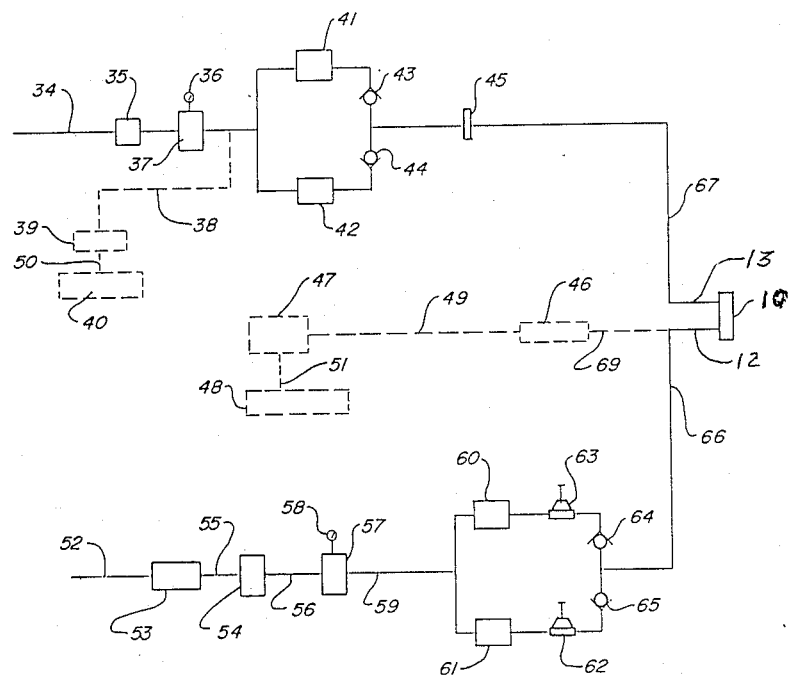
FIG. 5 is a block diagram illustrating a system designed to deliver two or more coolants and/or lubricants to the guide block of FIGS. 1 through 4.

FIG. 5 is a block diagram of a system for use in applying different types of lubricants to guide blocks 16 of saw guide system 10. Specifically, means for supplying three different types of lubricants and/or coolants is provided. More specifically, water is pumped through line 34, through strainer 35, which is designed to remove particulate matter, into and through pressure switch 37, and into solenoid control valves 41 and 42. A pressure gauge 36 is utilized to monitor pressure in the system. If premixing of oil with the water going through line 34 is desired, a soluble oil reservoir 40 is provided. Soluble oil is pumped by metering pump 39 from soluble oil reservoir 40 through line 50 and into line 38. The resulting mixture is then pumped through solenoid control valves 41 and 42. Solenoid control valve 41 is a large solenoid control valve for allowing more fluid to flow therethrough, and solenoid control valve 42 is a smaller valve for allowing less fluid to flow therethrough. Check valves 43 and 44 are provided to restrict backflow, and a flow meter 45 is provided to monitor flow. The fluid pumped therethrough is then pumped through line 67 into line 13, and finally into saw guide system 10. Provision for the inclusion of nonsoluble oil is provided by the subsystem shown in dashed lines. Specifically, oil is stored in oil reservoir 48, pumped through line 51 to metering pump 47, through metering pump 47, through line 49 and into misting head 46. Mist created thereby is pumped through line 69 to line 12 and into saw guide system 10, where mixing with the fluid coming through line 13 occurs as previously discussed. The introduction of air into the mixing system of saw guide system 10 is accomplished by means of the subsystem shown in the lower portion of FIG. 5. Specifically, pressurized air is pumped through line 52 to filter 53, which is designed to remove particulate matter from the air, through line 55, through lubricator 54, through line 56, through pressure switch 57, which maintains the desired pressure, and through line 59 into solenoid control valves 60 and 61. A pressure gauge 58 is utilized to monitor pressure at pressure switch 57. Pressure regulators 62 and 63 are provided to control the air pressure being applied to saw guide system 10 and may be preset at different pressures so that, bY the operation of the proper solenoid control valve 60 or 61, different pressures can be conveyed to saw guide system 10. Air coming from pressure regulators 62 and 63 exits through check valves 64 and 65, which are one-way valves which prevent back-flow of fluid into the air system. The air passing through check valves 64 and 65 passes through line 66 into line 12 and into the saw guide system 10, where it is mixed with other lubricants and/or coolants as previously discussed. With the use of such a system, it is possible to introduce a combination of water, soluble oil, insoluble oil, air and/or other lubricants and coolants into saw guide system 10 while maintaining strict control of the combination, the mixing and the resulting mist utilized to cool and lubricate saw blades 15.

While the foregoing description of the invention has shown preferred embodiments using specific terms, such description is presented for illustrative purposes only. It is applicant's intention that changes and variations may be made without departure from the spirit or scope of the following claims, and this disclosure is not intended to limit applicant's protection in any way.

I claim:

1. A saw guide for use with saw blades, comprising:
   a guide block having:
      a first hole therein;
      a second hole therein;
      mixing means for mixing substance in said first hole with substance in said second hole;
      a third hole communicating with said first hole and said mixing means whereby substance in said first hole is routed to said mixing means;
      a fourth hole communicating with said second hole and said mixing means whereby said substance in said second hole is routed to said mixing means, and
      orifice means communicating with said mixing means and positioned and oriented to deposit substances previously mixed by said mixing means on a saw blade,
   thereby lubricating and cooling said saw blade.

2. The invention of claim 1, wherein said first and second holes extend through said guide block so that a group of said guide blocks positioned and held togetner with said first holes of said guide blocks communicating with each other and said second holes of said guide blocks communicating with each other form a complete saw guide system usable with several saw blades to increase efficiency.

3. The invention of claim 2, including:

first supply means communicating with said first hole of said guide block for supplying a first substance to said guide block, and second supply means communicating with said second hole of said guide block for supplying a second substance to said guide block.

4. The invention of claim 2, including:

sealing means for minimizing leakage from said first and second holes, and clamp means for holding said group of said guide blocks in substantially rigid position and orientation with respect to each other.

5. The invention of claim 1, including:

first supply means communicating with said first hole of said guide block for supplying a first substance to said guide block, and second supply means communicating with said second hole of said guide block for supplying a second substance to said guide block.

6. The invention of claim 5, wherein said first supply means includes means for supplying air and controlling the pressure thereof and said second supply means includes means for supplying fluid and controlling the pressure thereof.

7. The invention of claim 5, wherein said first supply means includes means for supplying a lo first liquid and controlling the pressure thereof and said second supply means includes means for supplying a second fluid and controlling the pressure thereof.

* * * * *